US011845572B2

(12) United States Patent
Vaujour et al.

(10) Patent No.: US 11,845,572 B2
(45) Date of Patent: Dec. 19, 2023

(54) SYSTEM AND METHOD FOR PROVIDING SPACECRAFT-BASED SERVICES

(71) Applicant: Loft Orbital Solutions Inc., San Francisco, CA (US)

(72) Inventors: Pierre-Damien Vaujour, San Francisco, CA (US); Lucas Bremond, San Francisco, CA (US); Pieter van Duijn, San Francisco, CA (US)

(73) Assignee: LOFT ORBITAL SOLUTIONS INC., San Francisco, CA (US)

( * ) Notice: Subject to any disclaimer, the term of this patent is extended or adjusted under 35 U.S.C. 154(b) by 387 days.

(21) Appl. No.: 17/231,655

(22) Filed: Apr. 15, 2021

(65) Prior Publication Data

US 2021/0245900 A1 Aug. 12, 2021

Related U.S. Application Data

(63) Continuation of application No. 16/520,067, filed on Jul. 23, 2019, now Pat. No. 10,981,678.

(60) Provisional application No. 62/712,622, filed on Jul. 31, 2018.

(51) Int. Cl.
*B64G 1/10* (2006.01)
*H04B 7/185* (2006.01)
*G05D 1/08* (2006.01)
*B64G 1/24* (2006.01)

(52) U.S. Cl.
CPC .......... *B64G 1/1085* (2013.01); *B64G 1/242* (2013.01); *G05D 1/0808* (2013.01); *H04B 7/18521* (2013.01)

(58) Field of Classification Search
CPC ...... B64G 1/1085; B64G 1/242; B64G 1/244; G05D 1/0808; H04B 7/18521; H04B 7/18519
See application file for complete search history.

(56) References Cited

U.S. PATENT DOCUMENTS

| 5,199,672 | A | 4/1993 | King et al. |
| 9,906,291 | B1 | 2/2018 | Nakamura et al. |
| 9,973,266 | B1 | 5/2018 | Avellan et al. |
| 2009/0194639 | A1 | 8/2009 | El Mabsout et al. |

(Continued)

FOREIGN PATENT DOCUMENTS

| CA | 2180058 A1 * | 2/1997 |
| CN | 101894367 A | 11/2010 |

(Continued)

OTHER PUBLICATIONS

Augenstein et al. (doc "Optimal Scheduling of a Constellation of Earth-Imaging Satellites, for Maximal Data Throughput and Efficient Human Management" (Year: 2016).*

(Continued)

*Primary Examiner* — Assres H Woldemaryam
(74) *Attorney, Agent, or Firm* — Fenwick & West LLP

(57) ABSTRACT

A system for providing spacecraft-based services, preferably including one or more spacecraft and one or more ground control elements, wherein the spacecraft can include one or more payloads associated with one or more organizations. A method for providing spacecraft-based services, preferably including receiving service requests, determining request assignments, and/or controlling spacecraft.

20 Claims, 12 Drawing Sheets

(56) References Cited

U.S. PATENT DOCUMENTS

| | | | |
|---|---|---|---|
| 2010/0115519 A1 | 5/2010 | Chechik et al. | |
| 2012/0275651 A1* | 11/2012 | Brown | G06F 16/51 |
| | | | 382/103 |
| 2016/0155073 A1* | 6/2016 | Augenstein | G06Q 10/06314 |
| | | | 705/7.24 |
| 2016/0247404 A1 | 8/2016 | Srivastava et al. | |
| 2017/0161584 A1 | 6/2017 | Guan et al. | |
| 2017/0192095 A1* | 7/2017 | Jobanputra | H04B 7/18517 |
| 2017/0285178 A1 | 10/2017 | Platzer et al. | |
| 2018/0034536 A1 | 2/2018 | Trutna et al. | |

FOREIGN PATENT DOCUMENTS

| | | | | |
|---|---|---|---|---|
| CN | 103744733 A | 4/2014 | | |
| CN | 104657795 A | 5/2015 | | |
| FR | 3024782 A1 * | 2/2016 | | B64G 1/1021 |

OTHER PUBLICATIONS

Varia et al. "Overview of Amazon Web Services" (Year: 2014).*

Mohammed, J. L., "Mission Planning for a Formation-Flying Satellite Cluster," Proceedings of the Fourteenth International Florida Artificial Intelligence Research Society Conference, May 2001, pp. 58-62.

United States Office Action, U.S. Appl. No. 16/520,067, filed Apr. 13, 2020, 15 pages.

Varia, J. et al., "Overview of Amazon Web Services," Amazon Web Services, Jan. 2014, 22 pages.

* cited by examiner

SYSTEM AND METHOD FOR PROVIDING SPACECRAFT-BASED SERVICES

CROSS-REFERENCE TO RELATED APPLICATIONS

This application is a continuation of U.S. patent application Ser. No. 16/520,067, filed on Jul. 23, 2019, now U.S. Pat. No. 10,981,678, which claims the benefit of U.S. Provisional Patent Application 62/712,622, filed on Jul. 31, 2018, the contents of which are incorporated herein by reference in their entirety.

TECHNICAL FIELD

This invention relates generally to the spacecraft-based services field, and more specifically to a new and useful system and method for providing spacecraft-based services.

BACKGROUND

Typical systems and methods for providing spacecraft-based services require users to either delegate control authority to external parties, thereby hampering operational flexibility, or to develop and/or acquire spacecraft operation capabilities, thereby requiring a substantial investment and ongoing maintenance from the user. Further, in typical spacecraft that include payloads associated with multiple users, the multiple users cannot directly operate the spacecraft (e.g., due to potential conflicts between operation instructions, due to dissimilar interests of the different users, etc.).

Thus, there is a need in the spacecraft-based services field to create a new and useful system and method for providing spacecraft-based services.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System

Figure 1A:
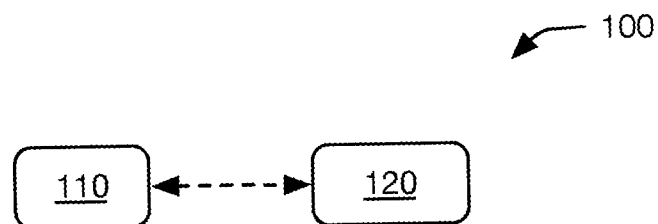
FIG. 1A is a schematic representation of an embodiment of the system.
Figure 1B:
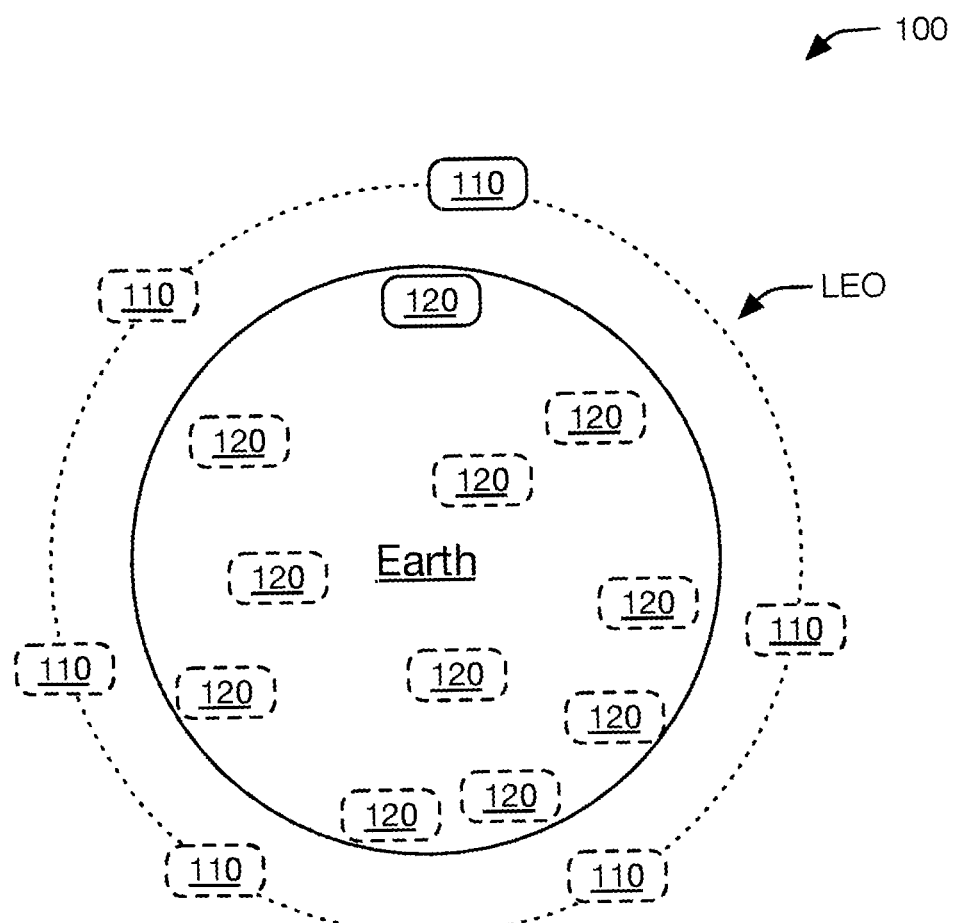
FIGS. 1B-1C are schematic representations of a first and second example, respectively, of the system.
Figure 1C:
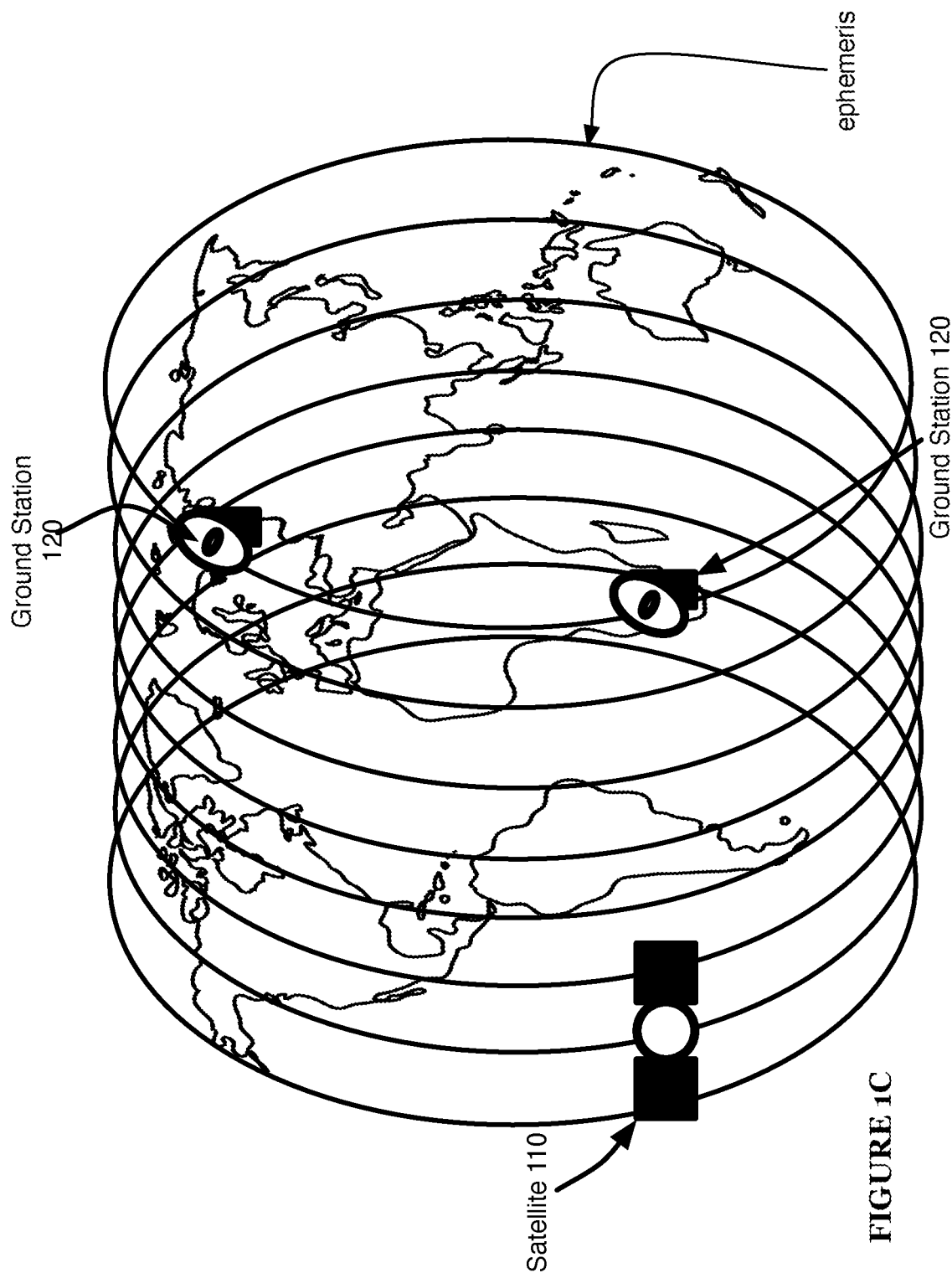

A system 100 for providing spacecraft-based services preferably includes one or more spacecraft 110 and one or more ground control elements 120 (e.g., as shown in FIGS. 1A-1C).

The spacecraft 110 of the system preferably define a constellation of satellites, wherein each spacecraft is preferably a satellite orbiting the Earth. The satellites are preferably in low earth orbit (LEO), such as satellites having an orbital period less than or equal to 128 minutes and/or an altitude (e.g., average altitude, maximum altitude, etc.) less than or equal to 2000 km. The constellation can additionally or alternatively include satellites in geosynchronous earth orbit (GEO), satellites in any other suitable earth orbit, and/or any other suitable spacecraft.

Each spacecraft is preferably associated with an ephemeris (e.g., information associated with the spacecraft's position over time). The ephemeris information can be represented by a two-line element set (TLE) and/or stored in any other suitable representation (or can alternatively not be stored or represented).

Figure 2A:
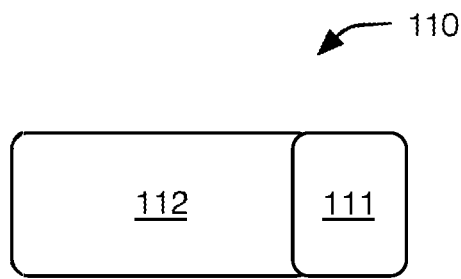
FIG. 2A is a schematic representation of an embodiment of a spacecraft.
Figure 2B:
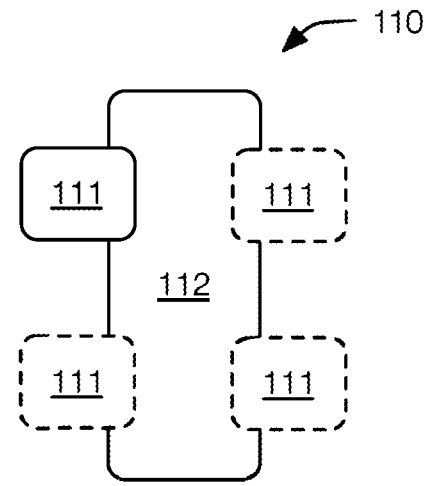
FIGS. 2B-2C are schematic representations of a first and second example, respectively, of the embodiment of the spacecraft.
Figure 2C:
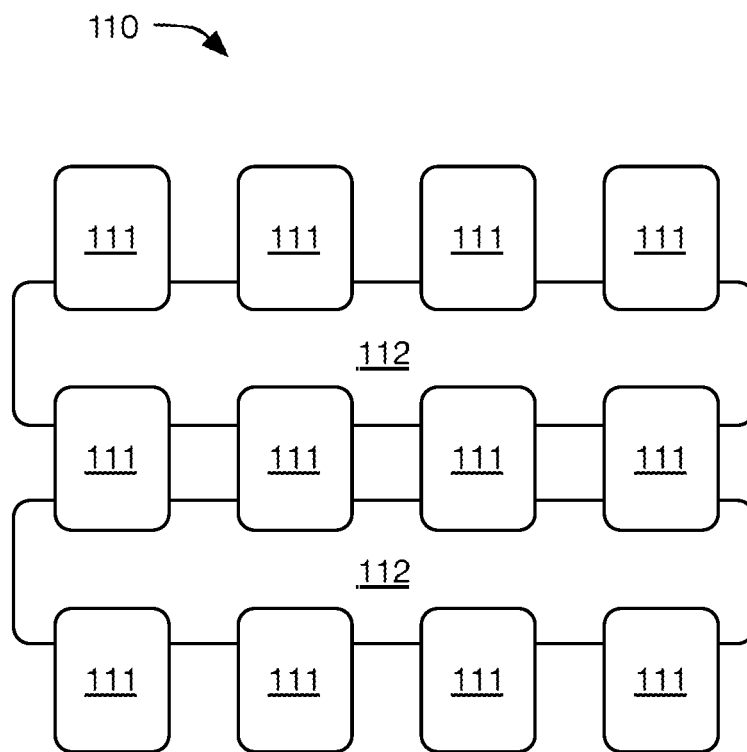

A spacecraft 110 preferably includes a set of payloads 111 and a hub 112 (e.g., as shown in FIGS. 2A-2C). In one embodiment, each spacecraft includes one or more payloads 111 (e.g., customer-specific payloads, such as payloads associated with a customer of a spacecraft-based services company controlling the system and/or elements thereof; generic payloads, such as payloads configured for general use by multiple customers; etc.), each connected (preferably mechanically, electrically, and communicatively) to a hub 112. Customer-specific payloads (e.g., payloads configured, provided, owned, leased, and/or otherwise controlled by a customer, payloads otherwise associated with the customer, etc.) can be provided by the customer, by the spacecraft-based services company, and/or by any other suitable entities. However, the spacecraft can additionally or alternatively include any other suitable elements in any suitable arrangement.

Some examples of payloads 111 can include one or more sensors. The sensors preferably include imaging sensors (e.g., cameras, synthetic-aperture radar sensors, etc.), but can additionally or alternatively include any other suitable sensors. The payload can optionally include actuators configured to aim and/or otherwise adjust operation of the sensor (e.g., reposition the sensor, adjust elements of the sensor such as apertures, shutters, filters such as spectral filters and/or polarization filters, etc.), and/or can include any other suitable elements configured to control sensor operation and/or state. One or more payloads can additionally or alternatively include propulsion elements. One or more payloads can additionally or alternatively include experimental elements, such as electronic elements (e.g., experimental flight computer, experimental circuitry, control electronics for conducting experiments, etc.).

Each payload 111 can additionally or alternatively include communication elements (e.g., configured to communicate with the hub 112, configured to communicate with terrestrial elements such as one or more ground control elements 120, etc.), such as radio frequency communication elements (e.g., RF transmitters and/or receivers), optical communication elements (e.g., laser communication elements), and/or quantum-based communication elements. Each payload 111 can additionally or alternatively include computation elements (e.g., configured to control sensor and/or communication element operation; configured to process data sampled by the sensors and/or received by the communication elements; configured to process commands such as commands received from the hub, from terrestrial elements such as ground control elements, etc.; and/or configured to perform any other suitable functions). In some embodiments, one or more payloads is a software-only payload, such as one or more software modules executing (and/or configured to be executed) on computation elements of the payload and/or the hub. The payloads can additionally or alternatively include one or more: radio frequency sensors (e.g., radios, antennas, etc.), weather monitoring instruments, climate monitoring instruments, scientific instruments (e.g., astrophysics instruments), cameras (e.g., optical, IR, hyperspectral, multispectral, etc.), radar instruments, Internet of Things transmitters, computers and/or computer circuitry, FPGAs, electronics modules, technology demonstration experiments, and/or any other suitable payload elements.

The payloads preferably do not include elements configured to control (and/or otherwise alter) spacecraft attitude and/or trajectory. In embodiments in which one or more payloads do include spacecraft attitude and/or trajectory control elements, operation of such elements is preferably mediated by (e.g., controlled exclusively by and/or with authorization from, controlled within limits set by, etc.) the hub and/or ground control elements. However, one or more payloads can additionally or alternatively include one or more payload-controlled spacecraft attitude and/or trajectory control elements.

Each payload is preferably restricted to remain within a specific volume (e.g., defined relative to the hub) allotted to the payload. For example, the payload can be restricted to remain within the volume at all times, or at all times except when authorized (e.g., by the hub and/or ground control elements) to extend outside the volume. However, the payloads can alternatively occupy any other suitable volumes.

However, each payload can additionally or alternatively include any other suitable elements in any suitable configuration. Each payload can optionally be associated with (e.g., assigned to, configured by, controlled by, owned by, provided by, etc.) one or more users or other entities. However, some or all of the payloads can alternatively be generic payloads (e.g., available to all users, or to all users qualified to access payloads of that type, and/or can be otherwise assigned). The generic payloads can include standard payloads (e.g., previously designed for and/or flown on other spacecraft, available as standard designs, available commercially off-the-shelf, etc.), customized payloads (e.g., customized, such as by a customer or spacecraft-based services company, for use in the system), and/or any other suitable payloads.

The hub 112 preferably functions to control spacecraft operation and/or coordinate operation of the payloads. The hub preferably includes a spacecraft bus (or multiple buses), and can optionally include an interface module (or multiple interface modules). In embodiments in which the hub includes an interface module, the interface module preferably functions as an interface (e.g., communication interface, mechanical interface, and/or electrical interface, etc.) between other elements of the spacecraft (e.g., between the bus and one or more of the payloads); and/or preferably functions as an interface (e.g., communication interface) between the spacecraft (e.g., the interface module; other elements of the spacecraft, such as the bus and/or payloads; etc.) and other elements of the system (e.g., ground control elements, other spacecraft, etc.). In such embodiments, the interface module can function to facilitate use of arbitrary payloads, buses, and/or payload-bus combinations in a spacecraft. In examples in which the interface module is engineered to interface with both the bus and the payloads, the bus does not need to be engineered based on specific characteristics of the payloads and/or of the interface module. In examples in which the interface module is further engineered to interface with the ground control elements (e.g., wherein the interface module is configured to communicate with the ground control elements in a standardized manner), preferably such that any communication between ground control elements and other elements of the spacecraft is intermediated via the interface element, the other spacecraft elements (e.g., bus, payloads) on the one hand and the ground control elements on the other hand do not need to be engineered based on specific characteristics of each other.

The hub (e.g., the interface module) is preferably connected to each payload, more preferably mechanically, communicatively, and electrically connected, but can alternatively have any other suitable arrangement and/or configuration with respect to the payloads. The hub (e.g., the bus and/or the interface module) preferably includes one or more power sources, attitude and/or trajectory control modules, astrionics modules (e.g., attitude determination sensors, command modules, telemetry modules, health sensors, etc.), communication modules, computation modules, sensors, and/or any other suitable elements. In some examples, the bus includes one or more power sources, attitude and/or trajectory control modules, and astrionics modules (e.g., attitude determination sensors, command modules, telemetry modules, health sensors, etc.), and the interface module includes one or more communication modules and computation modules. However, the elements of the hub can additionally or alternatively be distributed in any other suitable manner.

The hub preferably functions to measure and/or control spacecraft operation, such as by measuring and/or controlling spacecraft attitude and/or trajectory. In some examples, the hub (and/or any other suitable elements of the spacecraft) can include one or more astrionics modules (sun sensors, star trackers, magnetometers, Earth horizon sensors, global navigation satellite system receivers, etc.). For example, the hub can include attitude control mechanisms (e.g., reaction wheels, thrusters, control moment gyroscopes, etc.) and/or trajectory control mechanisms (e.g., propulsive devices), such as trajectory control mechanisms used for orbital station-keeping and/or orbit alteration.

The hub preferably controls spacecraft communication with the ground control elements (e.g., wherein all terrestrial communication is performed via the hub, wherein the hub authorizes communication with any terrestrial elements, wherein the hub communicates with the ground control elements). For example, the hub can include one or more wireless communication modules, such as those configured to communicate (e.g., transmit and/or receive) using the X band, Ka band, UHF band, and/or any other suitable frequencies. However, communication modules of the payloads may additionally or alternatively communicate with the ground control elements, other terrestrial elements, and/or any other suitable elements.

The hub preferably controls spacecraft power generation (e.g., wherein the hub controls power generation module operation, such as by deploying, aiming, and/or stowing solar power harvesting elements such as solar cells) and/or provision (e.g., wherein the hub allots, budgets, and/or dispenses power to other elements of the spacecraft, such as to the payloads). However, the hub can additionally or alternatively include any other elements in any suitable configuration and/or can perform any other suitable functions.

The constellation (or other collection of spacecraft) can be a homogeneous constellation (e.g., including only identical or substantially identical spacecraft) or a heterogeneous constellation (e.g., including multiple types of spacecraft, such as spacecraft with different capabilities and/or constituent elements, spacecraft designed and/or constructed by different suppliers and/or in different countries, etc.). For example, the spacecraft can include the same or different hub and/or the same or different payloads of each other.

The ground control elements 120 (e.g., terrestrial control elements) preferably define a ground control network (e.g., terrestrial control network), such as a network of communication stations capable of communication with spacecraft of the constellation at various locations throughout their orbits. Each ground control element preferably includes one or more communication elements configured to communicate with spacecraft of the constellation (e.g., with the hubs, with the payloads, etc.), such as one or more wireless communication modules (e.g., configured to transmit and/or receive using the S band, X band, Ka band, UHF band, and/or any other suitable frequencies). The ground control elements can additionally include communication modules configured to communicate with users of the system (e.g., via the Internet, via private terrestrial communication channels, etc.) and/or with other entities (e.g., information providers, such as weather status and/or prediction providers, satellite tracking information providers, map information providers, news providers, etc.). However, the ground control elements can additionally or alternatively include any other suitable communication modules configured to send and/or receive any other suitable information.

The ground control elements can additionally or alternatively include one or more computation modules. For example, the computation modules can be configured to receive user requests, optimize constellation usage, and/or determine commands to send to the spacecraft. However, the computation modules can additionally or alternatively perform any other suitable tasks.

The ground control elements 120 can additionally or alternatively include any other suitable elements in any suitable arrangement. In some embodiments, the system can include ground control elements of one or more different types (e.g., having one or more different types of wireless communication modules) and/or associated with (e.g., owned by, operated by, controlled by, leased by, designed by and/or for, collocated with, etc.) one or more different entities (e.g., spacecraft-based services provider, customer, spacecraft communications provider, government spacecraft operation agency, etc.). Due to the modular characteristics of some embodiments of the system 100, it can be facile to develop and/or modify aspects of the system 100 (and/or the method 200) to integrate new ground control elements and/or new types of ground control elements with the system 100 (e.g., integrate new ground control elements into an already-functioning system 100, such as a system that has already performed and/or is currently performing the method 200 described below). Analogously, in some embodiments, it can additionally or alternatively be facile to integrate new types of spacecraft and/or spacecraft components (e.g., payloads, buses, interface modules, etc.) into the system.

However, the system 100 can additionally or alternatively include any other suitable elements.

2. Method

Figure 3:
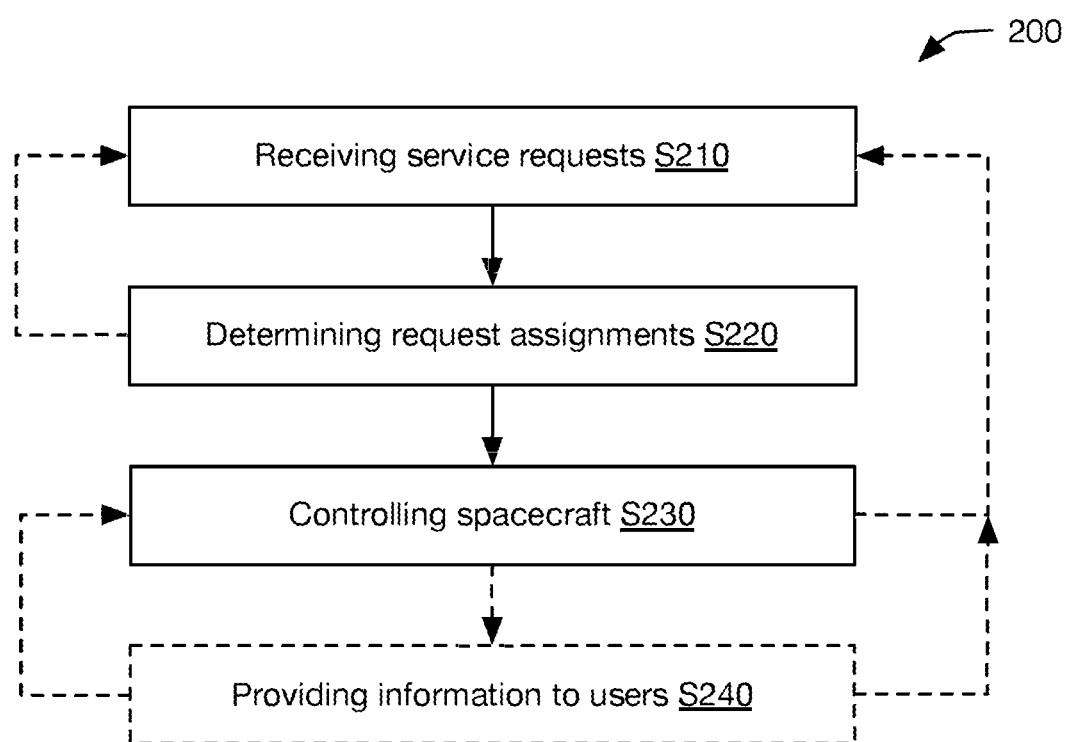
FIG. 3 is a flowchart representation of an embodiment of the method.

A method 200 for providing spacecraft-based services preferably includes: receiving service requests S210; determining request assignments S220; and/or controlling spacecraft S230 (e.g., as shown in FIG. 3). The method 200 can optionally include providing information (e.g., data) to users S240. However, the method can additionally or alternatively include any other suitable elements.

The method 200 is preferably performed using the system 100 described above. In some embodiments, one or more elements of the method 200 (e.g., elements involving computation and/or requiring use of one or more computational modules, such as one or more of S210, S220, S230, and/or S240) are performed using cloud computing (e.g., are performed using one or more remote computing systems, such as servers operated by a spacecraft-based services provider, by a cloud computing provider, etc.), but can additionally or alternatively be performed using any other suitable computational modules. Additionally or alternatively, one or more elements of the method 200 can be performed using edge computing (e.g., performed using computational modules of the spacecraft), such as performing portions of S220 and/or S230 at a computational module of a spacecraft associated with those portions (e.g., for a request associated with a particular spacecraft, at a computational module of the spacecraft, determining a request assignment and/or controlling the spacecraft based on the request assignment). Such edge computing approaches can be beneficial due to potential limitations on communication between the spacecraft and the ground control elements (e.g., bandwidth limitations, temporal limitations such as due to a need for line-of-sight communication, etc.). However, the method 200 can additionally or alternatively be performed using any other suitable elements of the system 100, and/or using any other suitable system(s).

2.1 Receiving Service Requests

Figure 7A:
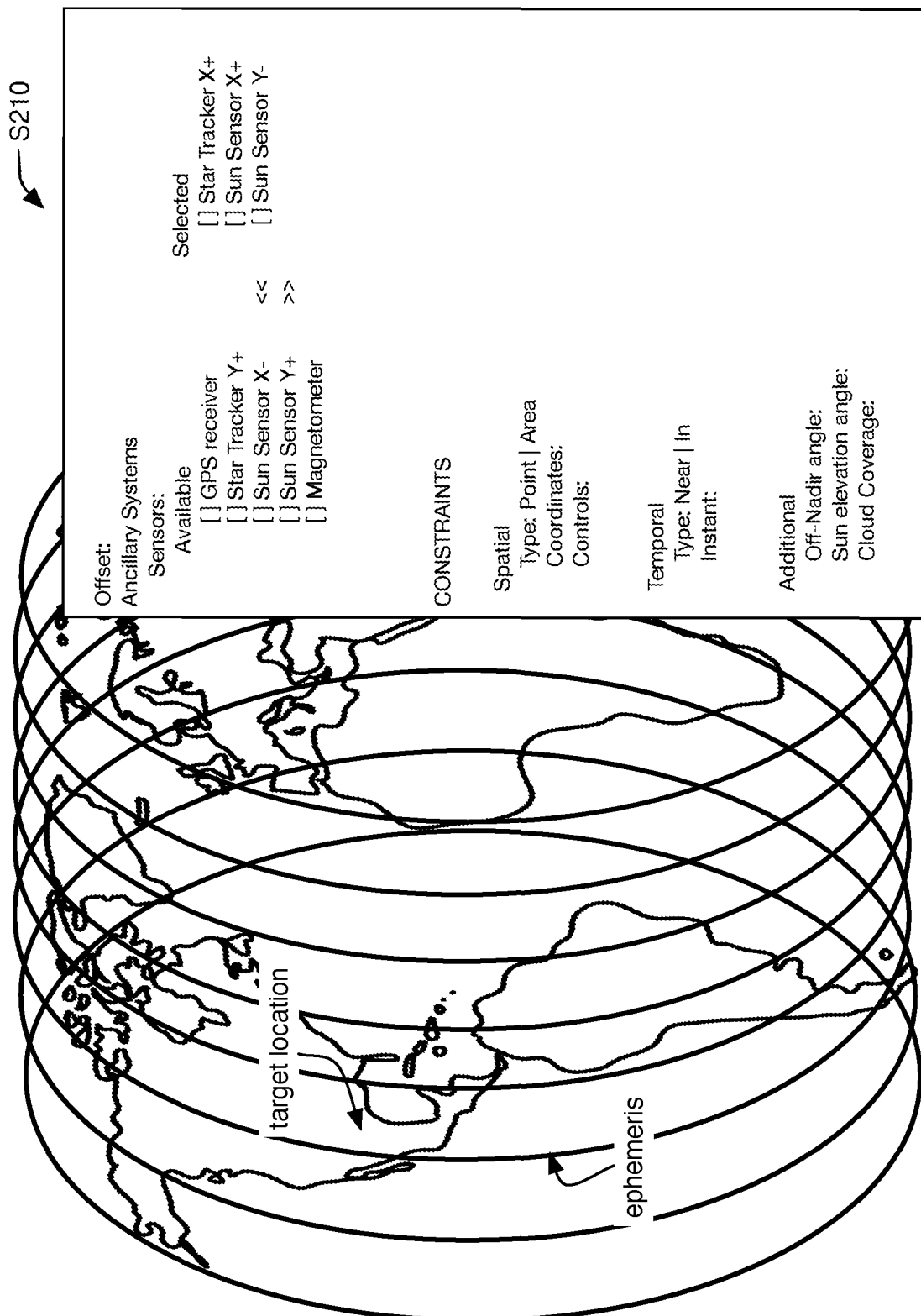
FIGS. 7A-7E depict various portions of a specific example of the method.
Figure 7B:
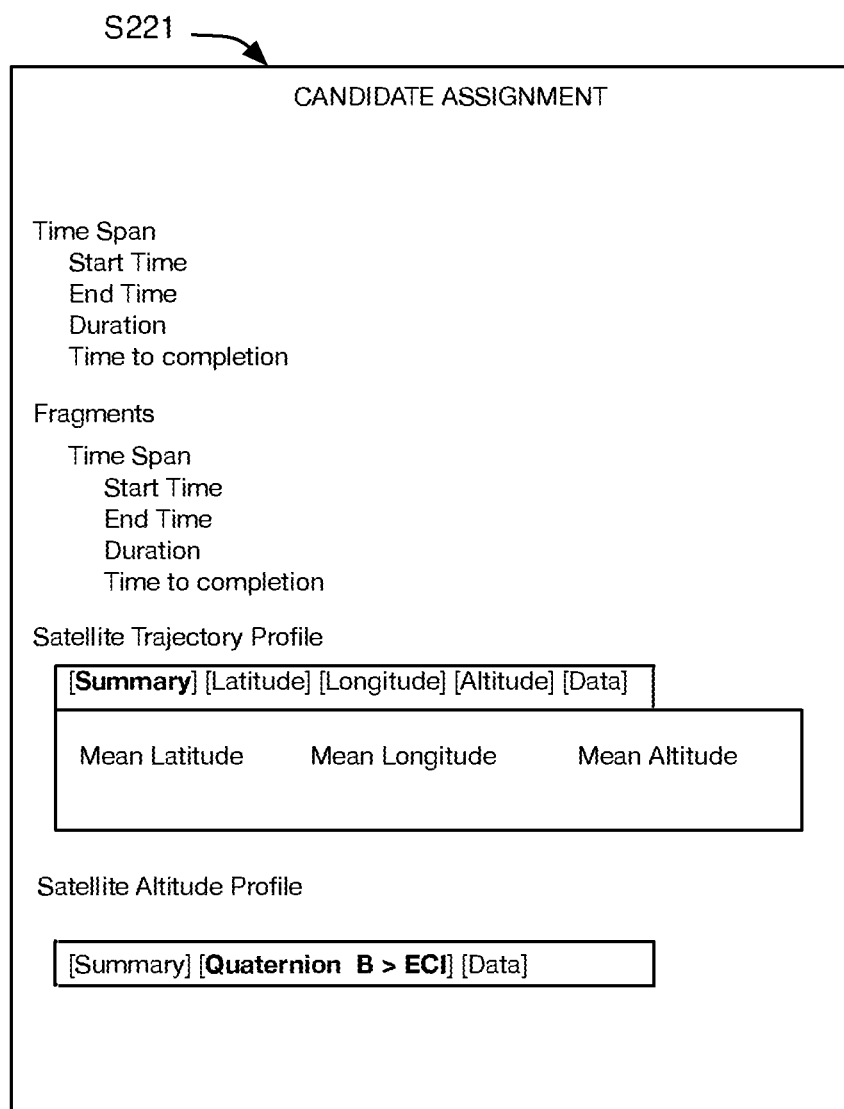
Figure 7C:
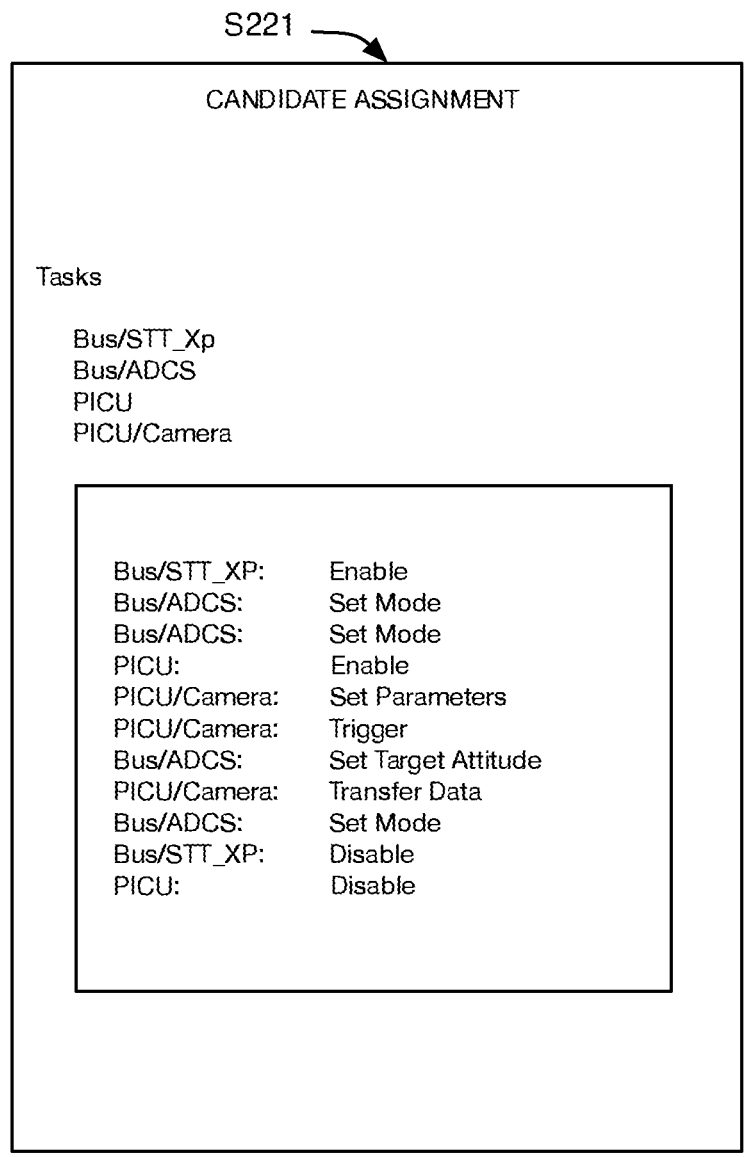

Receiving service requests S210 preferably functions to receive a set of one or more requests (e.g., such as described in U.S. Provisional Application Ser. No. 62/712,622, filed on 31 Jul. 2018 and titled "Autonomous Mission Control System", which is incorporated in its entirety by this reference) for spacecraft-based services. Each request preferably includes a set of specifications (e.g., parameter set) which can define the desired and/or required parameters for fulfilling the request (e.g., as shown in FIG. 7A). The specifications (e.g., constraints) can include asset specifications, temporal specifications, spatial specifications (e.g., target location specifications), and/or any other suitable specifications.

Asset specifications can define which spacecraft and/or spacecraft elements (e.g., payloads, sensors, etc.) can perform the service. The asset specifications preferably include payload capability specifications (e.g., sensor specifications). For example, the specifications can include a specific payload, a payload type (e.g., any of a number of identical, substantially identical, or similar payloads, such as payloads of different spacecraft), and/or a payload element type (e.g., sensor type, such as a class of imaging sensor). The payload capability specifications can additionally or alternatively include one or more sensor parameters (e.g., wavelength(s) or spectral range to be imaged, resolution, framerate, swath, polarization, pointing accuracy, etc.) and/or payload operation parameters (e.g., payload and/or payload element settings, files to upload, etc.), such as configuration parameters and/or minimum or desired performance metrics. Although described herein as sensor specifications, the asset specifications can analogously include specifications associated with payload elements other than sensors (e.g., actuators, communication modules, etc.). The asset specifications can optionally include ancillary element specifications. For example, the specifications can include parameters associated with one or more astrionics elements (e.g., elements described above regarding the system, such as regarding sensors of the hub, etc.). In examples, the astrionics elements can include attitude determination sensors (e.g., sun sensors, star trackers, magnetometers, Earth horizon sensors, etc.), and the associated specifications can include availability (e.g., whether or not such elements are installed or available for use), alignment (e.g., direction(s) in which such elements are aligned), and/or performance (e.g., accuracy, precision, temporal resolution, etc.) metrics. However, the asset specifications can additionally or alternatively include any other specifications associated with the spacecraft (and/or spacecraft elements) employed to perform the service.

Spatial specifications (e.g., target location specifications, such as geographic specifications) preferably include one or more spatial references (e.g., geographic point, region, area, volume, etc.) associated with the requested service (e.g., a point or region to be imaged by the sensor of the spacecraft). The spatial information (e.g., target location) can be specified using geographic coordinates (e.g., latitude, longitude, and/or altitude), can be selected or drawn on a map (e.g., world map, regional map, etc.), can be specified relative to another location or other reference (e.g., stationary reference, mobile reference, etc.), can be specified based on one or more events (e.g., location of an event of interest, such as a news, meteorological, and/or geological event, such as described below in further detail regarding trigger events), can be specified based on relative positions of multiple objects (e.g., wherein the spatial specifications are satisfied if the payload is in the shadow of the Earth), and/or can be specified in any other suitable manner. However, the specifications can additionally or alternatively include any other suitable target location and/or geographic specifications.

Temporal specifications can include a specific time point (e.g., wherein the service should be performed at or near the specified time point, such as within a predetermined or computed time interval of the specified time point), can include a time interval (e.g., wherein the service is required or preferred to be performed within the time interval), can specify that the service is preferably performed as soon as possible (or as soon as possible after a specified trigger occurs), can be linked to one or more trigger events, can be determined based on external information sources (e.g., wherein criteria associated with the desired timing are provided by the user, and the temporal specifications are determined based on the criteria and information from the external information source), and/or can include any other suitable temporal specifications. Trigger events can include, in examples: occurrence of an event of interest (e.g., news, meteorological, and/or geological event, such as a demonstration, extreme weather event, or volcano eruption, etc.), preferably in or affecting the associated location; financial market based triggers, such as price changes across threshold values (e.g., stock or index of interest drops below or rises above a threshold price); detection of activity in the associated location, such as from terrestrial sensors and/or other space-based imaging; and/or any other suitable triggers.

The temporal specifications can be for a single time or interval, or for a periodic set of times or intervals (e.g., specifying a time of day, a day of the week, a time relative to sunrise or sunset, etc). For periodic specifications, the request can be a request to perform the service once at any of the times or during any of the intervals (e.g., preferably performed sooner rather than later), or can be a recurring request (e.g., a request to repeat service performance at each of the times or intervals, or at a subset thereof). However, the specifications can additionally or alternatively include any other suitable temporal specifications.

The specifications can additionally or alternatively include specifications associated with the spacecraft and/or sensor position relative to the target location and/or flight configuration (e.g., off-nadir angle), can include specifications associated with the other objects in the environment (e.g., associated with the position of the sun, such as solar elevation angle; associated with the position of the moon; etc.), can include specifications associated with known and/or predicted weather conditions (e.g., cloud cover, temperature at the target location, etc.), can include specifications associated with financial aspects of service performance (e.g., price charged to the requesting user to perform the service and/or to acquire appropriate rights for the requested service, etc.), and/or can include any other suitable specifications associated with performance of the service request and/or associated with conditions at or near the target location. However, S210 can additionally or alternatively include receiving any other suitable specifications in any other suitable manner.

In some examples, S210 can include receiving a service request that includes one or more specifications determined (e.g., by the system) to be potentially erroneous (e.g., non-physical; atypical for the user, customer, payload, spacecraft, and/or constellation; etc.). In such examples, S210 can include processing the service request as it was received, ignoring (e.g., discarding) the service request, modifying the service request (e.g., predicting a replacement value for each potentially incorrect specification), requesting that the user correct the service request (e.g., along with an explanation of the potentially-erroneous specification), and/or handling the service request in any other suitable manner.

In some examples, S210 can include receiving one or more simplified service requests (e.g., requests in which some specifications are implicit, or are assumed to take on a default value, rather than being explicitly provided by the user). In response to receiving a simplified service request, S210 can include determining additional specifications (based on the simplified request) and associating them with the request. For example, a simplified service request can include a request to image a particular region during the daytime, wherein other parameters of the request (e.g., imaging spectrum, performance criteria, deadline for completion, etc.) are not provided by the user. In response to receiving this simplified request, S210 can include associating the simplified request with one or more of: a default imaging spectrum specification (e.g., visible spectrum), a default sun elevation angle specification (e.g., greater than 30°), a default off-nadir angle specification (e.g., less than 30°), and/or a default deadline for completion (e.g., 1 week).

S210 can additionally or alternatively include receiving one or more requests for direct mode communication. For example, such direct mode requests can include requests to schedule a time interval for communication between a user and a payload (e.g., a specific payload, a payload determined based on asset specifications and/or any other suitable specifications such as described above, etc.), such as while the spacecraft is tasked to perform a synchronous action (e.g., performing a predefined attitude maneuver) while facilitating user-payload communication. In some examples, a direct mode request can include a request to communicate with and/or control elements of a spacecraft, such as described below regarding S232.

The service requests are preferably received by the ground control network (e.g., received by one or more computational elements, such as servers associated with service request receipt and/or processing). The service requests can be received from one or more users (e.g., customers) via one or more user interfaces (e.g., graphical user interface such as an interface presented to a user via a user device, application programming interface, etc.) with the ground control elements (e.g., via the internet). The service requests can additionally or alternatively be automatically generated (e.g., generated periodically, such as in association with a recurring job), such as defined by a previous user configuration, and/or can be otherwise defined (e.g., contractually defined, such as in a contract with a customer). The service requests can additionally or alternatively be received from other ground control elements and/or from spacecraft. For example, if one spacecraft fails to fulfill an assigned service request, the request can be reassigned to a different spacecraft (e.g., by generating a new service request, such as a service request with the same specifications, or with specifications modified to accommodate for changed circumstances and/or elapsed time since the original service request was received). However, the service requests can additionally or alternatively be received in any other suitable manner and/or be received by any other suitable elements.

The service requests are preferably received individually (e.g., at the time they are generated, such as generated by a customer via a user interface with the ground control network). However, the service requests can additionally or alternatively be received in batches (e.g., from other servers and/or other ground control elements, etc.) and/or received with any other suitable timing.

However, S210 can additionally or alternatively include receiving any other suitable service requests in any suitable manner.

2.2 Determining Request Assignments

Figure 8:
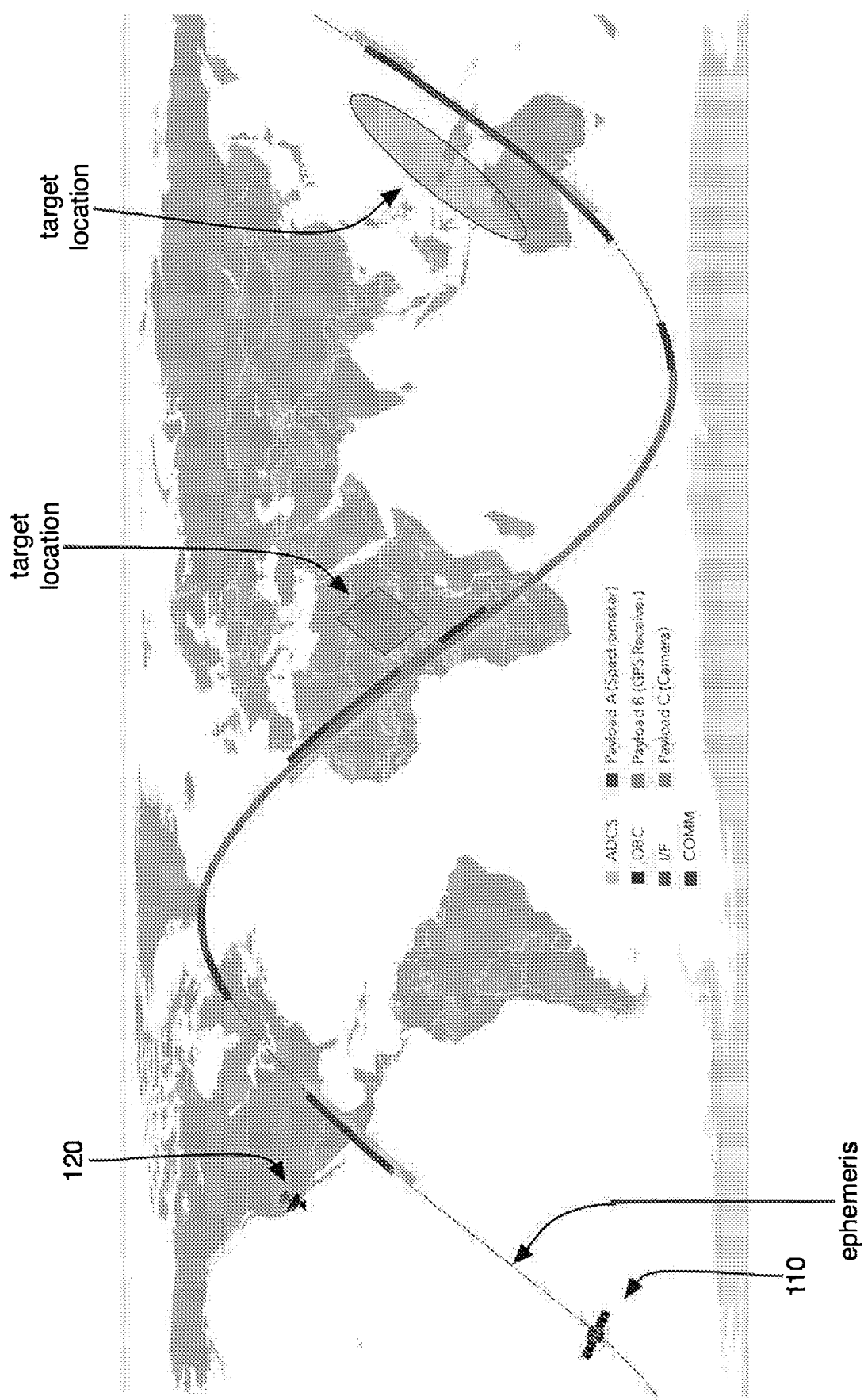
FIG. 8 is a schematic representation of an example spacecraft operation plan of the method.

Determining request assignments S220 preferably functions to assign assets (e.g., spacecraft; payloads, sensors, and/or other elements thereof; etc.) to perform requested services during appropriate time intervals and/or while orbiting over appropriate locations (e.g., as shown in FIG. 8). Each request assignment (e.g., task, such as described in U.S. Provisional Application Ser. No. 62/712,622, filed on 31 Jul. 2018 and titled "Autonomous Mission Control System", which is incorporated in its entirety by this reference) preferably includes (e.g., specifies) and/or is otherwise associated with one or more assets (e.g., payloads and/or sensors thereof) of specific spacecraft, and preferably includes and/or is otherwise associated with one or more time intervals during which the service is to be performed. The request assignment can optionally include spacecraft operation parameters (e.g., parameters controlled by the hub, such as described above, such as attitude, power provision, and/or any other suitable parameters. For example, these parameters can be specified by target values, acceptable ranges, and/or in any other suitable manner.

The request assignments are preferably determined based on: the specifications (e.g., for the set of service requests received in S210); the ephemerides (e.g., of the constellation and/or a subset of spacecraft thereof); communication considerations (e.g., times at which the ground station elements can communicate with the spacecraft, quantities of data expected to be sent to and/or received from the spacecraft during these times, etc.); spacecraft resources (e.g., power generation and/or storage states, such as battery state of charge; spacecraft attitude control rates such as slew rates; heat generation and/or dissipation requirements; etc.); constraints associated with spacecraft configuration (e.g., arising from elements of the hub, from other payloads of the spacecraft, etc.); and/or any other suitable information. The assignments can additionally or alternatively be determined based on user permissions and/or asset restrictions, such as contractual or legal permissions and/or restrictions. For example, a particular customer may have exclusive rights to use a particular asset within a particular geographic region (e.g., wherein, when outside the geographic region, the asset may be available for other customers' service requests). The assignments can additionally or alternatively be determined based on user and/or request priorities, such as contractual and/or legal priorities, rule-based priorities (e.g., wherein service requests are prioritized based on the order in which they were received), and/or any other suitable priorities. The assignments can additionally or alternatively be determined based on auxiliary information, such as information received from auxiliary information sources (e.g., as described above), such as cloud cover information (e.g., predicted cloud cover information) determined based on weather forecast information and/or current weather conditions. The assignments can additionally or alternatively be determined based on currently pending request assignments (e.g., based on service requests that have already been assigned to a particular asset, based on candidate request assignments presented to other users, such as described below in more detail, etc.). For example, the existing assignments can be prioritized over new requests (e.g., requests received after the assignment was determined for the other request, requests received after beginning to perform S220 for previously-received requests, etc.). The assignments can additionally or alternatively be determined based on device-specific restrictions. For example, such restrictions can include a maximum illumination threshold for a sensor, and determining assignments based on the restriction can include avoiding aiming the sensor toward the Sun. However, the assignments can additionally or alternatively be determined based on any other suitable information.

S220 can optionally include, for each request (or a subset thereof), determining a swarm of spacecraft (or a swarm of spacecraft-mounted payloads) that may be able to perform the requested service (e.g., wherein each spacecraft of the determined swarm includes the necessary payload and/or ancillary equipment, such as determined based on the asset specifications received in S210).

S220 preferably includes performing a multi-objective or many-objective optimization to determine the request assignments (e.g., performing a local or global search over the parameter space to search for one or more optimal assignment sets). In some examples (e.g., in which the optimization problem is formulated as a Dynamic Constraint Satisfaction Problem), the optimization can be performed using a combination of heuristics and combinatorial search methods. S220 can include determining an assignment for each request received in S210, determining assignments for as many requests as possible (e.g., for the highest priority requests), determining requests that maximize an overall objective function defined over the request assignment space (e.g., defined based on the request specifications, aspects of the users and/or spacecraft, etc.), and/or determining assignments for any other suitable subset of requests.

Figure 4A:
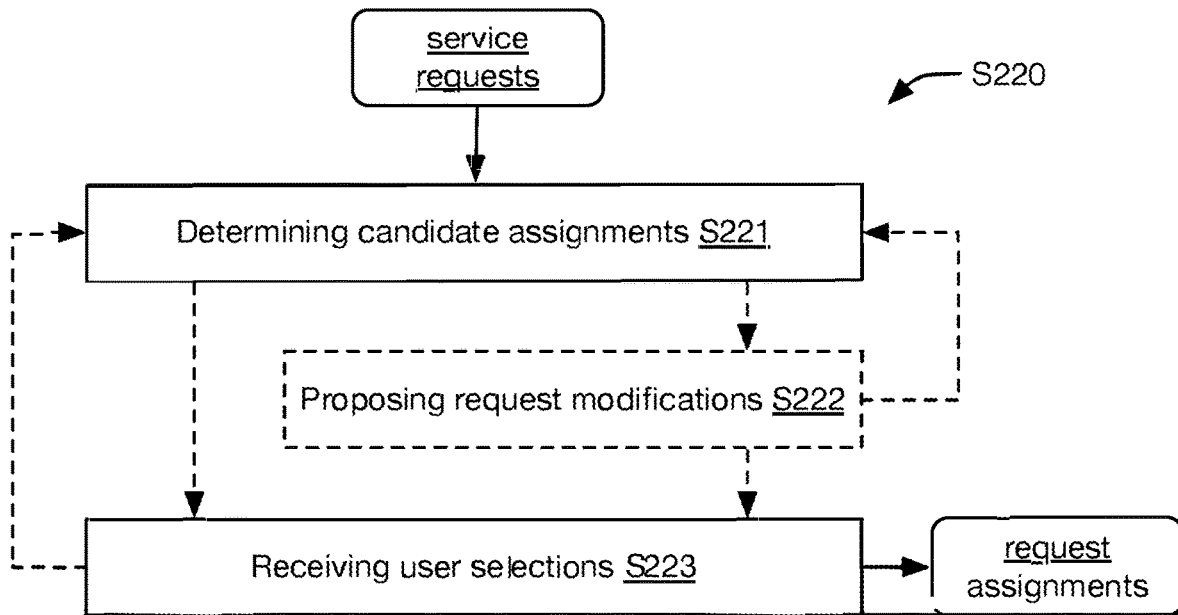
FIGS. 4A-4B are flowchart representations of examples of a first and second portion of the method, respectively.
Figure 5:
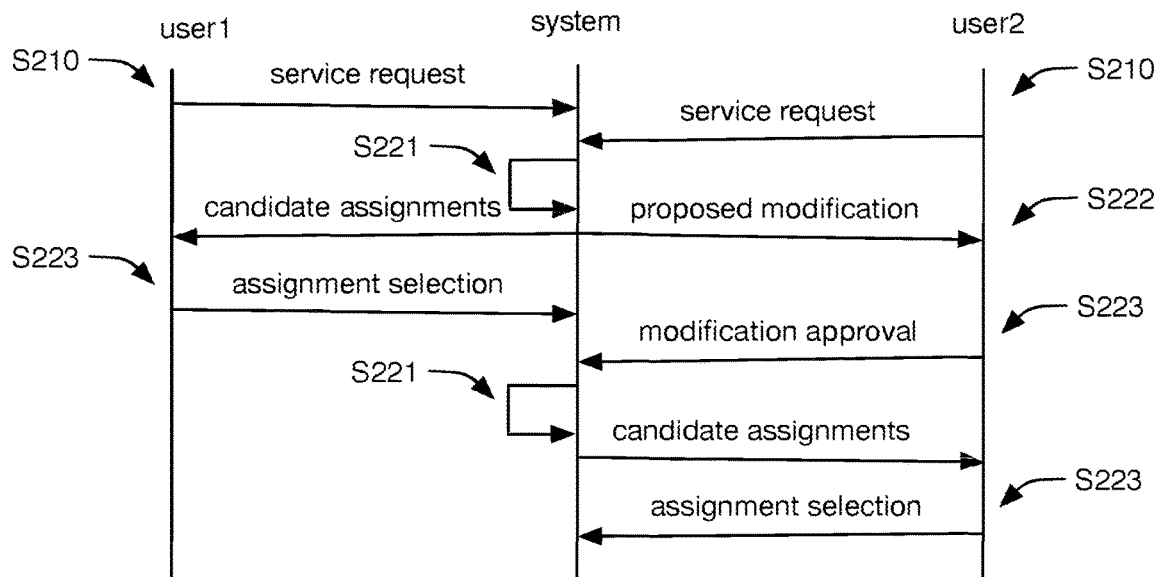
FIG. 5 is a schematic representation of an embodiment of a portion of the method.
Figure 6:
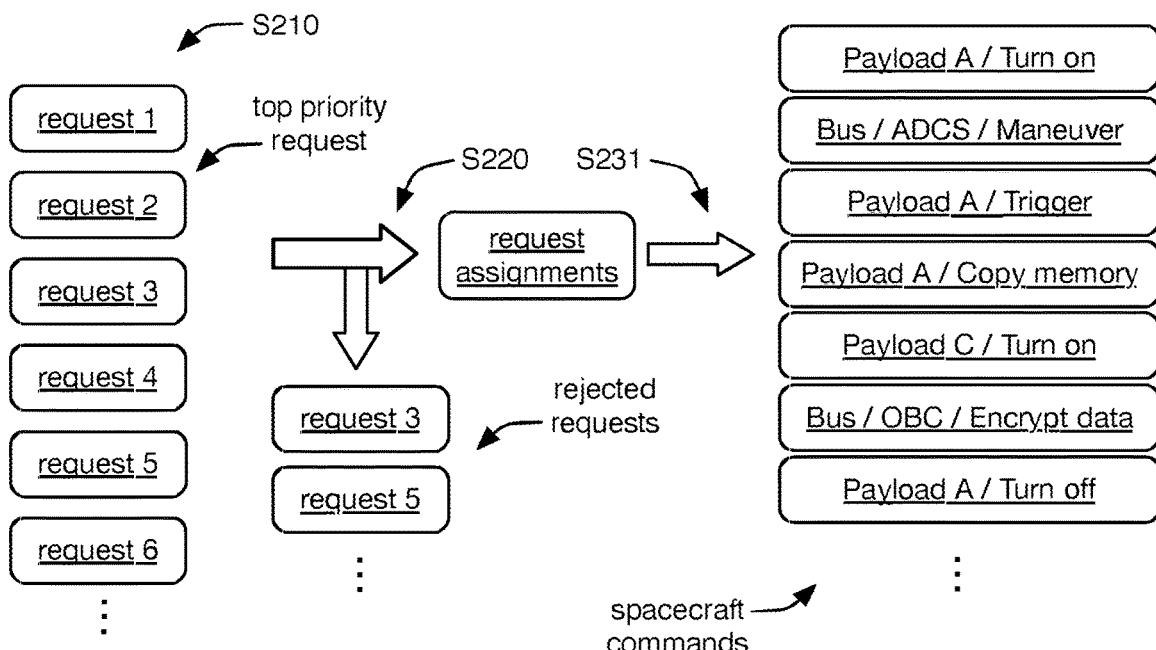
FIG. 6 is a schematic representation of an example of a portion of the method.

In some embodiments, S220 can include: determining candidate assignments S221; proposing request modifications S222; and/or receiving user selections S223 (e.g., as shown in FIGS. 4A, 5, and/or 7B-7E).

Figure 7D:
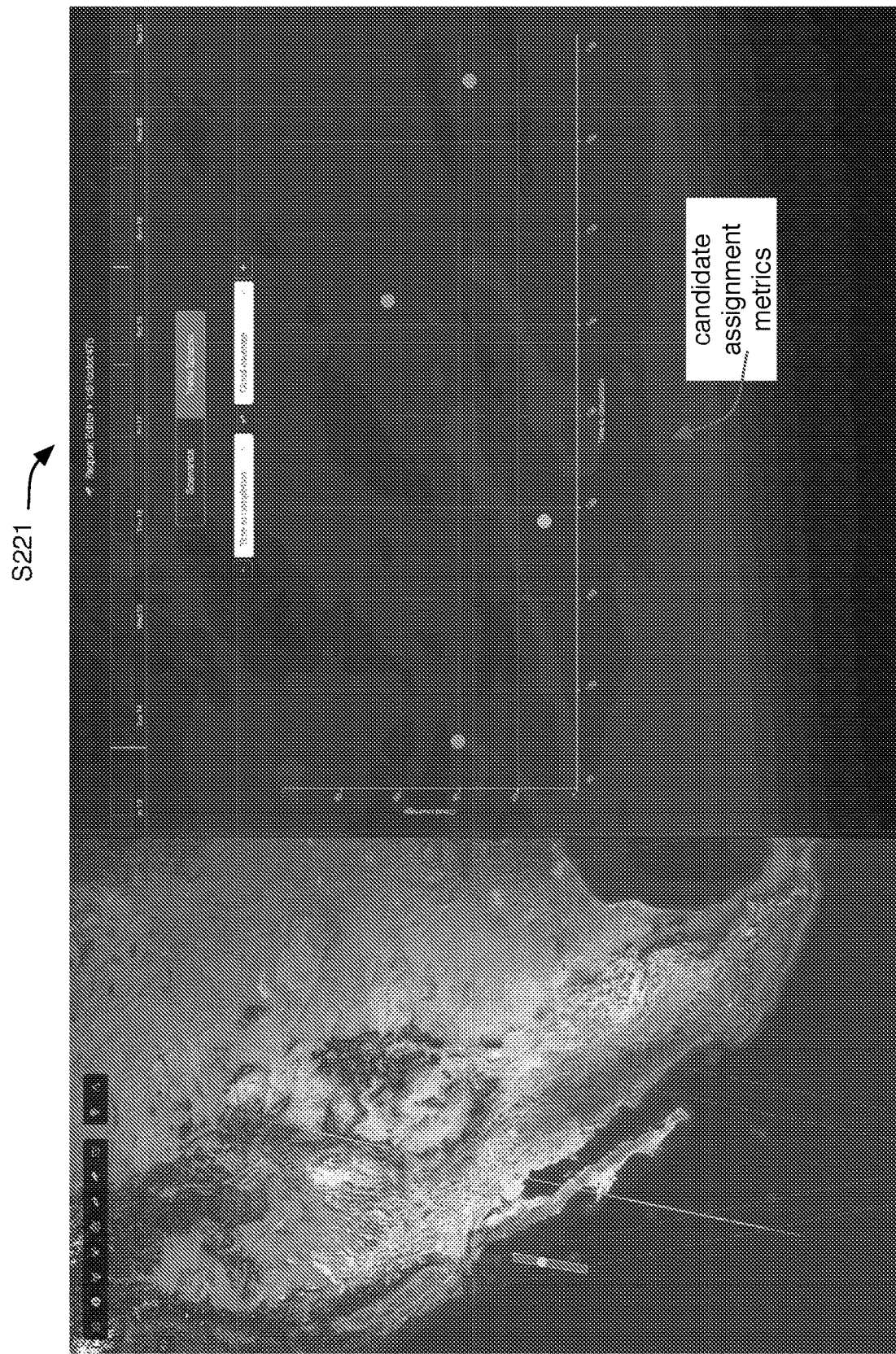
Figure 7E:
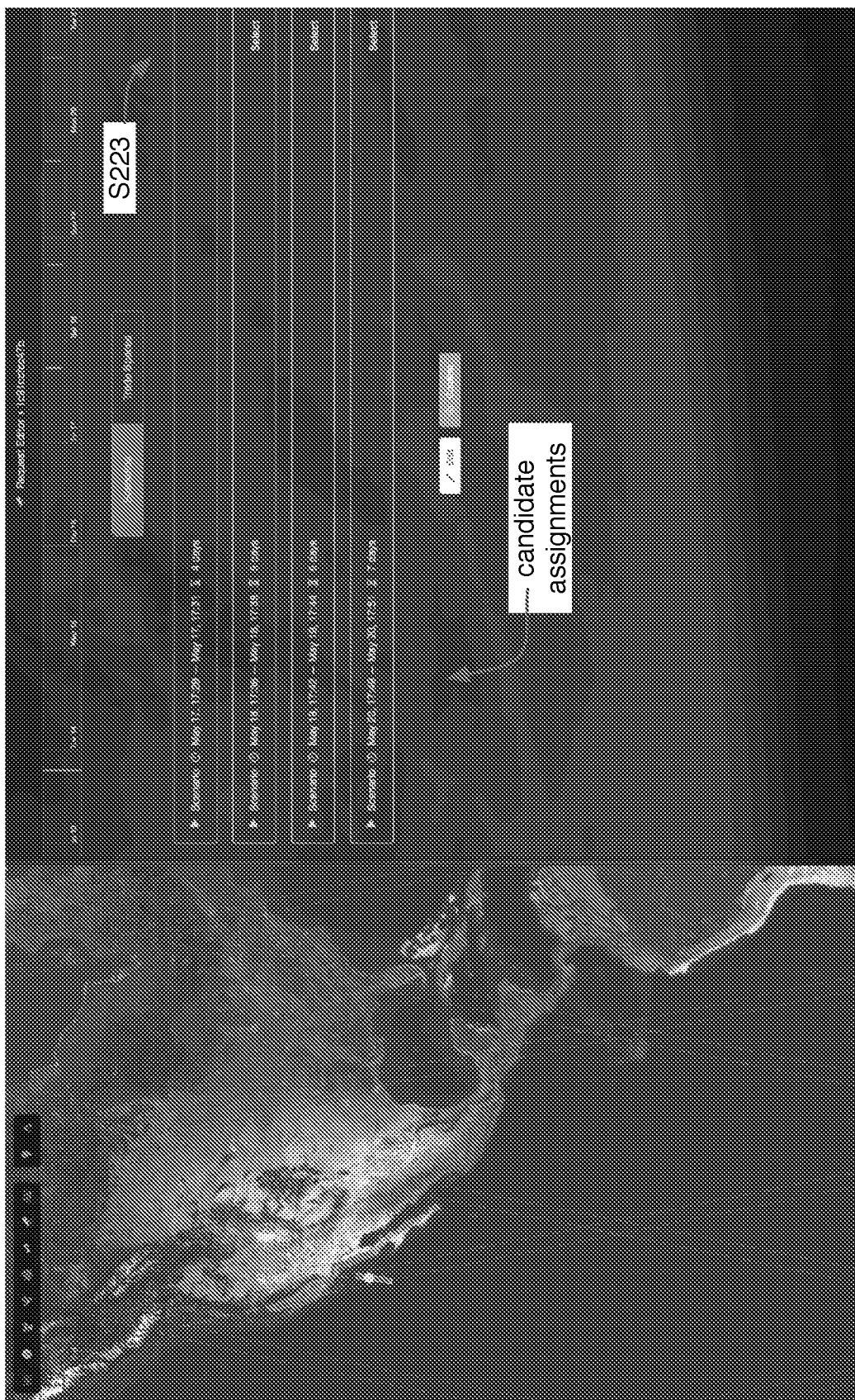

Determining candidate assignments S221 preferably includes, for each request (or a subset thereof), determining a set of candidate assignments (e.g., operational scenarios) and presenting the candidate assignments to the user. For some requests ("failed requests"), the set of candidate assignments may be the empty set (e.g., wherein no potential assignments can satisfy the service request, wherein other service requests are prioritized over the failed request, etc.). S221 can optionally include determining one or more metrics associated with the candidate assignments (e.g., metrics corresponding to one or more specifications of the corresponding request). For example, S221 can include, for each candidate assignment of the set, determining one or more of: timing, off-nadir angle, solar elevation angle, predicted cloud cover, service cost, and/or any other suitable metrics. The candidate assignments are preferably presented to the user and/or other entity associated with the service request (e.g., request generator, customer associated with the request and/or asset, etc.). The candidate assignments are preferably presented in association with (e.g., together with) the determined metrics. For example, the candidate assignments can be presented in a graphical format depicting each candidate assignment's performance with respect to one or more of the metrics (e.g., as shown in FIG. 7D). However, S221 can additionally or alternatively include determining candidate assignments in any other suitable manner.

S220 can optionally include proposing request modifications S222. For example, if a service request has few or no candidate assignments (and/or if S220 otherwise fails to determine an adequate assignment for the service request), the method may include proposing request modifications for the service request. S222 can include determining one or more specifications of the request that may be overly restrictive (e.g., specifications that, if relaxed, could enable determination of additional candidate assignments). S222 preferably includes suggesting possible resolutions to the user (and/or other associated entities) based on the overly restrictive specifications. In a first example, S222 includes determining that a spatial resolution requirement is slightly too stringent for a payload that could otherwise satisfy the service request and, in response to the determination, suggesting that the user reduce the spatial resolution requirement to the resolution available using that payload. In a second example, S222 can include determining that the service request could (or might be able to) be satisfied at a time outside the temporal specifications, such as one day after the desired time interval, and, in response to the determination, suggesting that the user include the feasible time in the set of allowable times. However, S222 can additionally or alternatively include proposing request modifications in any other suitable manner. S222 can optionally include performing (e.g., repeating) S221 based on the proposed request modifications. For example, one or more candidate assignments that satisfy the proposed modifications, but not the original specifications, can be determined and presented to the user (e.g., along with candidate assignments that satisfy the original specifications), preferably with an indication of the candidate assignments' failure to satisfy the original specifications (e.g., an indication of the specification modification required to accept a candidate assignment).

In response to performance of S221 and/or S222 (e.g., presentation of choices and/or options to the user), the user can provide one or more selections. Receiving user selections S223 preferably functions to inform performance of subsequent elements of the method (e.g., used for determination of the final assignments).

In a first example, in which the user is presented a plurality of candidate assignments (e.g., determined in S221), the user preferably selects one or more of the candidate assignments. In this example, the selected assignment (or assignments) is preferably set as the final assignment for the service request.

In a second example, in which the user receives one or more suggested resolutions (determined in S222), the user preferably accepts the suggestion, modifies the service request specifications based on the suggestion, or cancels the service request. In this example, one or more elements of S220 (e.g., S221, S222, and/or S223) are preferably performed in response to receiving the modified specifications, wherein the modified specifications are used in place of the original specifications.

In some embodiments, the user selections received in S223 can alter the set of candidate assignments associated with one or more other service requests. For example, if a selected assignment for a first service request conflicts with a candidate assignment for a second service request, the conflicting candidate assignment can be removed from the set of candidates for the second request in response to selection of the assignment for the first request. Additionally or alternatively, if a rejected candidate assignment for a first service request conflicts with a possible assignment for a second service request (e.g., which was not presented to the user due to this conflict), the conflicting possible assignment can be added to the set of candidate assignments for the second request in response to rejection of the candidate assignment for the first request (e.g., rejection indicated by selection of a different candidate assignment, by cancelation of the service request, etc.). However, S223 can additionally or alternatively include receiving any other suitable user selections and/or acting in any other suitable manner based on the received selections.

In some embodiments, S220 is performed individually for each service request received (e.g., performed in response to receiving each service request, such as in a first received, first assigned order), whereas in other embodiments, S220 can be performed for a set of multiple service requests at once. For example, the service requests can be processed in batches, such as processed periodically, or processed in response to a pending request metric exceeding a threshold value (e.g., total number of pending requests, number of users with pending requests, total amount of asset time requested, and/or any other suitable metric). Pending requests can include all requests not yet fulfilled, only requests not yet assigned, and/or any other suitable set of pending requests. Additionally or alternatively, S220 can be performed when a threshold time interval before potential request fulfillment remains (e.g., performed only for requests that may be performed within a second time interval, performed for all pending requests, etc.). The possible request fulfillment time can be the first possible or available time for a pending request, can be the most likely time, can be a time with a likelihood of availability for assignment greater than a threshold likeliness, can be a user-specified time such as a time associated with a service request temporal specification (e.g., earliest portion of a time interval for service request performance, desired performance time, latest possible time for service request performance, etc.), and/or can be any other suitable time. However, S220 can additionally or alternatively be performed with any other suitable timing.

2.3 Controlling Spacecraft

Figure 4B:
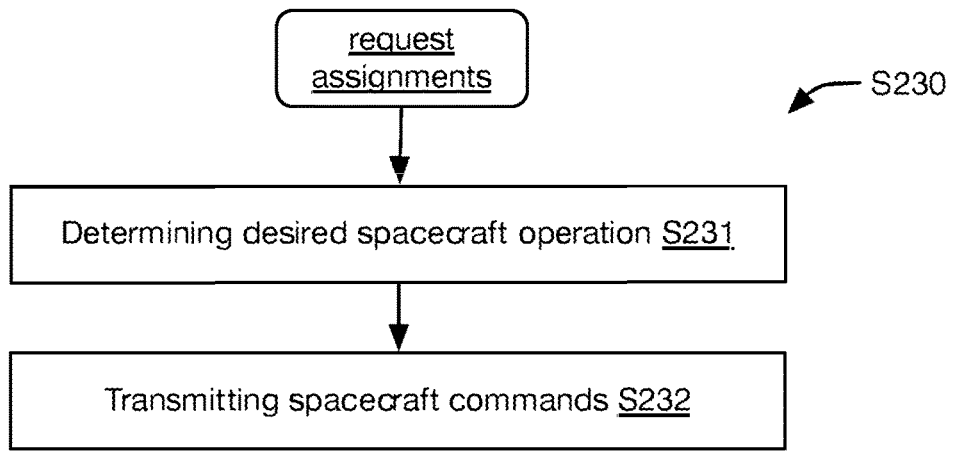

Controlling spacecraft S230 preferably functions to control the constellation of spacecraft (or a subset thereof) to fulfill the assigned service requests. S230 preferably includes determining desired spacecraft operation S231 and/or transmitting spacecraft commands S232 (e.g., as shown in FIGS. 4B and/or 6).

Determining desired spacecraft operation S231 preferably functions to determine spacecraft operation parameters for fulfilling the service requests assigned to each spacecraft. S231 preferably includes, for each spacecraft, based on the service requests assigned to that spacecraft, determining hub operation parameters and/or payload operation parameters. Hub operation parameters can include spacecraft attitude and/or attitude adjustments, spacecraft trajectory and/or trajectory adjustments, spacecraft power provisioning and/or budgeting, communications provisioning and/or budgeting, and/or any other suitable aspects of hub and/or overall spacecraft operation. Payload operation parameters can include sensor configuration (e.g., aiming, aperture adjustment, filter adjustment, exposure time, frame rate, capture mode, compression mode, sensor gain, etc.), operation (e.g., actuating sensors to collect data), and/or any other operation parameters associated with elements of the payload. S231 is preferably performed before and/or during a communication time window for a particular spacecraft (e.g., before the spacecraft enters communication range of a ground control element, while the spacecraft is within communication range of the ground control element, etc.). During performance of S231, the desired spacecraft operation is preferably determined for a time interval that extends at least until the beginning of the subsequent event communication time window (e.g., such that spacecraft commands for the entire time interval during which the spacecraft is unavailable for communication can be transmitted during the upcoming communication time window), but can additionally or alternatively be determined for any other suitable time interval(s). S231 is preferably performed automatically (e.g., without human assistance), but can additionally or alternatively be performed in any other suitable manner. However, S231 can additionally or alternatively include determining any other suitable spacecraft operation information.

Transmitting spacecraft commands S232 preferably functions to provide control instructions (e.g., associated with the desired spacecraft operation determined in S231) to the spacecraft. S232 is preferably performed at a ground control element within communication range of the spacecraft. S232 preferably includes transmitting commands associated with the operations determined in S231 (e.g., commands to perform and/or otherwise follow the desired operations). S232 is preferably performed substantially as soon as possible. For example, in response to determining a request assignment and/or determining the associated desired spacecraft operation, the method can include determining spacecraft commands based on the desired operation, and transmitting the commands substantially as soon as communication with the spacecraft can be established (e.g., immediately in response to the spacecraft coming into communication range of a ground station element).

The spacecraft commands are preferably transmitted to the hub (e.g., to the interface module) of the spacecraft, wherein the hub (e.g., the interface module) controls the payloads and other spacecraft elements based on the commands. For example, the hub can relay the appropriate payload-specific commands to the respective payload for which they are directed, and/or the hub can generate payload-specific commands (e.g., which it provides to the payload) based on commands received from the ground control element. However, the hub can additionally or alternatively control the payloads based on the commands in any other suitable manner. In embodiments in which the hub includes an interface module (e.g., as described above), the interface module preferably receives the spacecraft commands, and preferably controls both the payloads and other elements of the hub (e.g., the bus) based on the received commands. In such embodiments, the interface module can function to facilitate use of arbitrary payload-bus combinations in a spacecraft (e.g., wherein the interface module is engineered to interface with both the bus and the payloads, such that the bus does not need to be engineered based on specific characteristics of the payloads and/or of the interface module). For example, by managing communication with and/or control of the payloads and the bus via the interface module, a need to enable direct communication and/or control mechanisms between the bus and payloads can be avoided (e.g., in contrast with typical spacecraft, in which payloads interface directly with a bus, such as wherein the bus controls operation of the payloads or wherein one or more payloads controls operation of the bus).

In some embodiments, transmitting spacecraft commands S232 can optionally include facilitating direct mode user operation (e.g., wherein a service request for direct mode operation has been assigned to the spacecraft). Direct mode user operation can include unidirectional or bidirectional communication with the spacecraft. Direct mode operation preferably enables substantially direct communication between the user and the payload (e.g., communication substantially unaltered by intermediaries, such as ground control elements and/or the hub). For example, the communication can be end-to-end encrypted between the user and the payload (e.g., such that the intermediaries are incapable of decrypting the communications, such that the intermediaries are incapable of sending encrypted communications that purport to originate from the endpoints but actually do not, etc.). However, this direct communication is preferably routed through the ground control network and/or the hub (e.g., rather than a direct radio transmission from the user to the payload).

Direct mode operation preferably does not enable user control of any aspects of overall spacecraft operation (e.g., attitude and/or trajectory control, spacecraft power provision, etc.), operation of other payloads, aside from the payload with which the user is engaged in direct mode operation (e.g., disallowing the user to actuate and/or configure sensors of other payloads), and/or any other spacecraft operation aspects aside from those directly related to the payload with which the user is communicating in direct mode operation. Alternatively, direct mode operation may allow the user to control or request spacecraft operation changes (e.g., within a predetermined adjustment range, such as a range in which concurrent and/or temporally nearby service request assignments can still be successfully performed). For example, S220 can include determining such allowable adjustment ranges based on the set of service requests assigned to the spacecraft, wherein S232 includes enabling the user to control spacecraft operation within the determined ranges. However, S232 can additionally or alternatively include transmitting any other suitable spacecraft commands in any suitable manner, and/or S230 can additionally or alternatively include controlling the spacecraft in any other suitable manner.

2.4 Providing Information to Users

The method 200 can optionally include providing information to users S240. S240 can include receiving information from one or more spacecraft (e.g., received at one or more ground control elements). The information can include data (e.g., sensor data such as image data, telemetry, etc.) sampled during service request fulfillment and/or at any other suitable times. Sensor data can include data sampled by one or more sensors of the spacecraft (e.g., of one or more payloads, etc.). Telemetry can include information associated with hub state (e.g., power module state such as battery depth of discharge, component temperatures, electrical metrics such as current and/or voltage associated with one or more conductive lines or electrical components, etc.), payload state (e.g., component temperatures; electrical metrics such as current and/or voltage associated with one or more conductive lines or electrical components; payload operation parameters such as gain, channel frequency, exposure parameters, etc.), overall spacecraft state (e.g., spacecraft position, attitude, trajectory, velocity, etc.), and/or any other suitable information. The information can additionally or alternatively include derivatives of such data (e.g., derived at the spacecraft). S240 can optionally include generating derivative information based on the information received from the spacecraft.

S240 preferably includes providing some or all such information (e.g., information received from the spacecraft and/or derivative information) to the user associated with the service request for which the data was sampled. For example, S240 can include receiving images of a requested geographic location (optionally along with telemetry collected during sampling of the images), optionally generating derivative map information based on the images (e.g., generating an orthomosaic map), and providing the images and/or derivative(s) to the user from whom the service request was received.

However, S240 can additionally or alternatively include providing any other suitable information to users in any other suitable manner.

2.5 Examples

In one example of the method, S210 includes receiving two service requests: a first service request with a first sensor specification, and a second service request with the second sensor specification. In this example, a spacecraft of the constellation includes a first payload that meets the first sensor specification and a second payload that meets the second sensor specification. In this example, the spacecraft is able to satisfy the first request during a first time interval if it is oriented within a first range of attitude, and the spacecraft is able to satisfy the second request during a second time interval if it is oriented within a second range of attitudes, wherein the second time interval overlaps the first time interval, and the second range of attitudes overlaps the first range of attitudes. In this example, S220 can include assigning the first service request to the first payload of the spacecraft and assigning the second service request to the second payload of the spacecraft. In this example, the method can further include (e.g., in S220 and/or S231) restricting the possible spacecraft attitudes during the time intervals such that the spacecraft is within the first attitude range during the first interval, and is within the second attitude range during the second interval (and therefore, during the sub-interval included in both the first and second time intervals, the spacecraft is restricted to the attitude sub-range that is within both the first and second attitude ranges).

In some variations of this example, the optimal spacecraft attitude for satisfying the first service request is not within the second attitude range. In a first specific example, S220 can include assigning either the first or second service request to a different spacecraft and/or different time interval (e.g., thereby enabling the use of the optimal or near-optimal attitude for fulfilling the first service request). In a second specific example, S220 can include operating in the overlapping attitude sub-range, despite such operation resulting in reduced performance for fulfilling the first service request.

However, the method 200 can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A method of providing spacecraft-based services, performed by a terrestrial control system, the method comprising:
   receiving a service request comprising a set of services to be performed, each service including one or more asset specifications associated with spacecraft equipment;
   identifying, from among a constellation of spacecraft with payloads, at least a first payload connected to a first spacecraft and a second payload connected to a second spacecraft different from the first spacecraft, the first payload and the second payload each including a spacecraft element that corresponds to one or more of the asset specifications of the service request, wherein at least one of the first payload and the second payload are owned by a different entity than the entity from which the service request is received;
   assigning a first service of the service request to the first payload for execution and a second service of the service request to the second payload for execution; and
   transmitting, to the constellation of spacecraft, instructions to control the first payload to execute the first service of the service request and to control the second payload to execute the second service of the service request.

2. The method of claim 1, wherein the constellation of spacecraft are associated with a plurality of entities.

3. The method of claim 2, wherein the spacecraft in the constellation of spacecraft have payloads that are associated with a plurality of entities.

4. The method of claim 1, wherein at least one of the first payload and the second payload is a shared payload owned by an entity associated with the terrestrial control system.

5. The method of claim 1, wherein assigning a service to a payload comprises determining that the asset specifications associated with the service can be met by the payload during a time interval that the payload is available to execute the service.

6. The method of claim 1 wherein the asset specifications of the service request specifies at least one of: a temporal specification, a location specification, and a weather specification.

7. The method of claim 1, wherein transmitting instructions to control the payload to execute the service of the service request comprises transmitting the instructions to a hub of the spacecraft of the constellation that is connected to the payload.

8. The method of claim 1, wherein a spacecraft of the constellation of spacecraft that is connected to the first payload is additionally connected to a plurality of other payloads that are assigned to execute different services of different service requests during the time interval.

9. The method of claim 1, wherein assignment of a service to a payload is based on the ephemerides of the spacecraft to which the payload is connected, and available resources of the spacecraft to which the payload is connected.

10. A terrestrial control system for providing spacecraft-based services, comprising a hardware processor and a non-transitory computer-readable storage medium storing instructions that, when executed by the hardware processor, cause the terrestrial control system to perform steps comprising:
    receiving a service request comprising a set of services to be performed, each service including one or more asset specifications associated with spacecraft equipment;
    identifying, from among a constellation of spacecraft with payloads, at least a first payload connected to a first spacecraft and a second payload connected to a second spacecraft different from the first spacecraft, the first payload and the second payload each including a spacecraft element that corresponds to one or more of the asset specifications of the service request, wherein at least one of the first payload and the second payload are owned by a different entity than the entity from which the service request is received;
    assigning a first service of the service request to the first payload for execution and a second service of the service request to the second payload for execution; and
    transmitting, to the constellation of spacecraft, instructions to control the first payload to execute the first service of the service request and to control the second payload to execute the second service of the service request.

11. The terrestrial control system of claim 10, wherein the constellation of spacecraft are associated with a plurality of entities.

12. The terrestrial control system of claim 11, wherein the spacecraft in the constellation of spacecraft have payloads that are associated with a plurality of entities.

13. The terrestrial control system of claim 10, wherein at least one of the first payload and the second payload is a shared payload owned by an entity associated with the terrestrial control system.

14. The terrestrial control system of claim 1, wherein assigning a service to a payload comprises determining that the asset specifications associated with the service can be met by the payload during a time interval that the payload is available to execute the service.

15. The terrestrial control system of claim 10 wherein the asset specifications of the service request specifies at least one of: a temporal specification, a location specification, and a weather specification.

16. The terrestrial control system of claim 10, wherein transmitting instructions to control the payload to execute the service of the service request comprises transmitting the instructions to a hub of the spacecraft of the constellation that is connected to the payload.

17. The terrestrial control system of claim 10, wherein a spacecraft of the constellation of spacecraft that is connected to the first payload is additionally connected to a plurality of other payloads that are assigned to execute different services of different service requests during the time interval.

18. The terrestrial control system of claim 10, wherein assignment of a service to a payload is based on the ephemerides of the spacecraft to which the payload is connected, and available resources of the spacecraft to which the payload is connected.

19. A non-transitory computer-readable storage medium storing executable instructions for providing spacecraft-based services that, when executed by a hardware processor, cause the hardware processor to perform steps comprising:
    receiving a service request comprising a set of services to be performed, each service including one or more asset specifications associated with spacecraft equipment;

identifying, from among a constellation of spacecraft with payloads, at least a first payload connected to a first spacecraft and a second payload connected to a second spacecraft different from the first spacecraft, the first payload and the second payload each including a spacecraft element that corresponds to one or more of the asset specifications of the service request, wherein at least one of the first payload and the second payload are owned by a different entity than the entity from which the service request is received;

assigning a first service of the service request to the first payload for execution and a second service of the service request to the second payload for execution; and transmitting, to the constellation of spacecraft, instructions to control the first payload to execute the first service of the service request and to control the second payload to execute the second service of the service request.

20. The transitory computer-readable storage medium of claim 19, wherein assigning a service to a payload comprises determining that the asset specifications associated with the service can be met by the payload during a time interval that the payload is available to execute the service.

\* \* \* \* \*